(12) United States Patent
Mathieu et al.

(10) Patent No.: US 8,818,708 B2
(45) Date of Patent: Aug. 26, 2014

(54) OPTIMUM DRIVING PATH ON FULL WINDSHIELD DISPLAY

(75) Inventors: Roy J. Mathieu, Rochester Hills, MI (US); Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 13/309,691

(22) Filed: Dec. 2, 2011

(65) Prior Publication Data

US 2013/0144521 A1 Jun. 6, 2013

(51) Int. Cl.
*G01C 21/00* (2006.01)
*G01C 21/34* (2006.01)

(52) U.S. Cl.
USPC .......................................... 701/410; 701/400

(58) Field of Classification Search
CPC .... G01C 21/26; G01C 21/3446; G01C 21/32; G01C 21/36
USPC ................................................. 701/400, 410
See application file for complete search history.

(56) References Cited

U.S. PATENT DOCUMENTS

| | | | |
|---|---|---|---|
| 6,986,581 B2 * | 1/2006 | Sun et al. ........................ | 353/31 |
| 7,090,355 B2 | 8/2006 | Liu et al. | |
| 7,182,467 B2 | 2/2007 | Liu et al. | |
| 7,213,923 B2 * | 5/2007 | Liu et al. ........................ | 353/31 |
| 7,460,951 B2 * | 12/2008 | Altan et al. .................... | 701/536 |
| 8,098,170 B1 | 1/2012 | Szczerba et al. | |
| 8,098,171 B1 | 1/2012 | Szczerba et al. | |
| 2008/0158510 A1 * | 7/2008 | Tant et al. ........................ | 353/14 |
| 2009/0268946 A1 * | 10/2009 | Zhang et al. .................... | 382/104 |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |

(Continued)

OTHER PUBLICATIONS

U.S. Appl. No. 12/900,566, Szczerba et al., not publ'd.

(Continued)

*Primary Examiner* — Ian Jen (57) ABSTRACT

A method to display a registered driving path image upon a transparent windscreen head-up display in a source vehicle includes monitoring an operating environment of the source vehicle, monitoring a driver registration input, determining a registered driving path image based upon the operating environment of the source vehicle and the driver registration input, and displaying the registered driving path image upon the head-up display.

15 Claims, 3 Drawing Sheets

(56) References Cited

U.S. PATENT DOCUMENTS

| | | |
|---|---|---|
| 2010/0253688 A1 | 10/2010 | Cui et al. |
| 2010/0253918 A1* | 10/2010 | Seder et al. ............. 353/13 |
| 2010/0254019 A1 | 10/2010 | Cui et al. |
| 2010/0289632 A1 | 11/2010 | Seder et al. |
| 2010/0292886 A1* | 11/2010 | Szczerba et al. ............. 701/29 |
| 2012/0089273 A1 | 4/2012 | Seder et al. |
| 2012/0093357 A1 | 4/2012 | Seder et al. |
| 2012/0169513 A1 | 7/2012 | Szczerba et al. |
| 2012/0169572 A1 | 7/2012 | Seder et al. |
| 2012/0169861 A1 | 7/2012 | Szczerba et al. |
| 2012/0173067 A1 | 7/2012 | Szczerba et al. |
| 2012/0173069 A1 | 7/2012 | Tsimhoni et al. |
| 2012/0174004 A1 | 7/2012 | Seder et al. |
| 2013/0076787 A1 | 3/2013 | Mathieu et al. |
| 2013/0141250 A1 | 6/2013 | Mathieu et al. |
| 2013/0142385 A1 | 6/2013 | Mathieu et al. |

OTHER PUBLICATIONS

U.S. Appl. No. 12/903,267, Seder et al., not publ'd.
U.S. Appl. No. 12/980,503, Szczerba et al., not publ'd.
U.S. Appl. No. 12/979,432, Szczerba et al., not publ'd.
U.S. Appl. No. 12/900,539, Seder et al., not publ'd.
U.S. Appl. No. 12/980,522, Seder et al., not publ'd.
U.S. Appl. No. 12/980,612, Szczerba et al., not publ'd.
U.S. Appl. No. 12/981,206, Tsimhoni et al., not publ'd.
U.S. Appl. No. 12/981,602, Szczerba et al., not publ'd.
U.S. Appl. No. 12/982,478, Seder et al., not publ'd.
U.S. Appl. No. 13/239,667, Mathieu et al., not publ'd.
U.S. Appl. No. 13/356,695, Mathieu et al., not publ'd.
U.S. Appl. No. 13/312,045, Mathieu et al., not publ'd.
U.S. Appl. No. 13/309,716, Mathieu et al., not publ'd.
U.S. Appl. No. 13/356,695, Mathieu, et al., not publshed.

* cited by examiner

OPTIMUM DRIVING PATH ON FULL WINDSHIELD DISPLAY

TECHNICAL FIELD

This disclosure is related to vehicle control related display upon a windscreen.

BACKGROUND

The statements in this section merely provide background information related to the present disclosure and may not constitute prior art.

Vehicle systems include capabilities to track vehicle movement, for example, with relation to a three dimensional map or coordinate system. Tracking vehicle movement can be accomplished through a global positioning device, use of on vehicle sensors such as camera, radar device, or a LIDAR device or other devices known in the art. Additionally, wireless communication can be utilized to provide navigational or informational support from a remote system or device, such as a remotely operated computer or cloud computing system.

Graphic projection systems can utilize an ultraviolet laser or other light source to project an image or graphics upon a vehicle surface. Projected graphics can include driver's aids, providing information to the driver to improve situational awareness or provide information related to a planned route or path of travel or operation of the vehicle.

SUMMARY

A method to display a registered driving path image upon a transparent windscreen head-up display in a source vehicle includes monitoring an operating environment of the source vehicle, monitoring a driver registration input, determining a registered driving path image based upon the operating environment of the source vehicle and the driver registration input, and displaying the registered driving path image upon the head-up display.

BRIEF DESCRIPTION OF THE DRAWINGS

One or more embodiments will now be described, by way of example, with reference to the accompanying drawings, in which.

DETAILED DESCRIPTION

Figure 1:
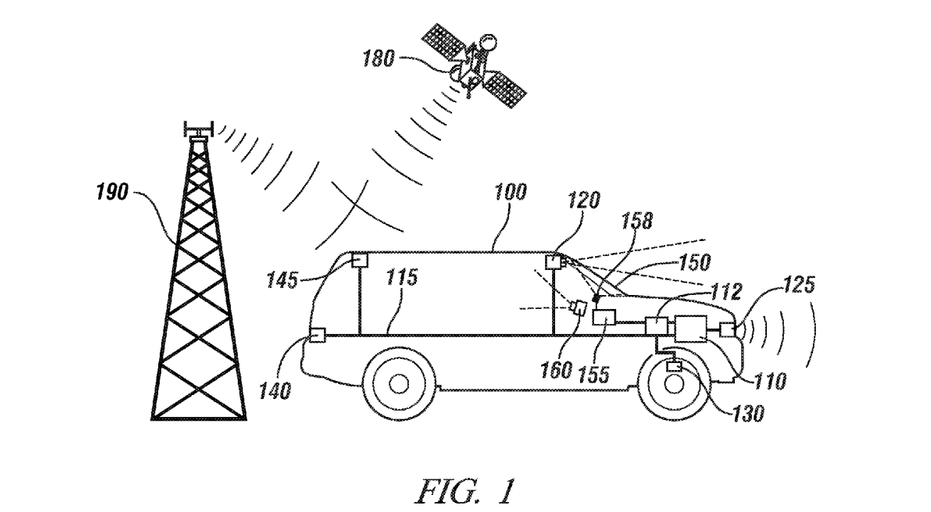
FIG. 1 illustrates an exemplary vehicle equipped with an enhanced vision system, in accordance with the present disclosure.

Referring now to the drawings, wherein the showings are for the purpose of illustrating certain exemplary embodiments only and not for the purpose of limiting the same, FIG. 1 illustrates an exemplary source vehicle 100 equipped with an enhanced vision system (EVS). An exemplary EVS is disclosed in co-pending U.S. application Ser. No. 12/417,077, which is incorporated herein by reference. Vehicle 100 includes an EVS system manager 110; vehicle sensor systems, including camera system 120 and radar system 125; vehicle operation sensors, including vehicle speed sensor 130; information systems, including global positioning device 140 and wireless communication system 145; head-up display (HUD) 150; EVS graphics system 155; graphics projection system 158; and occupant eye location sensing system 160. The EVS system manager can communicate directly with various systems and components, or the EVS system manager can alternatively or additionally communicate over a LAN/CAN system 115. Additionally, the EVS system manager can communicate with remote systems through wireless communication system 145.

The source vehicle can operate upon a roadway in isolation, such as a closed course or an open highway, and wherein placement and orientation of the vehicle upon the roadway is the primary input. Additionally, the source vehicle operates upon a roadway in the presence of other vehicle traffic or other obstacles that need to be taken into account to maneuver the source vehicle. Details of an operating environment of the source vehicle can be monitored by a number of vehicle sensor devices and/or systems. Camera system 120 includes a camera or image capturing device taking periodic or sequential images representing a view from the source vehicle. Radar system 125 includes a device known in the art utilizing electromagnetic radiation to detect other vehicles or objects located near the source vehicle. A number of known vehicle sensor devices are used within a vehicle to monitor vehicle speed, engine speed, wheel slip, and other parameters representative of the operation of the vehicle. Vehicle speed sensor 130 represents one such an in-vehicle sensor, but the scope of the disclosure includes any such sensors for use by the EVS. Global positioning device 140 and wireless communication system 145 communicate with resources outside of the source vehicle, for example, satellite system 180 and cellular communications tower 190. Global positioning device 140 may be utilized in conjunction with a three dimensional (3D) map database including detailed information relating to a global coordinate received by the global positioning device 140 regarding the current location of the source vehicle. In one embodiment, the location of the source vehicle is made more accurate by utilizing corresponding data from vehicle sensor devices, for example, camera images and analysis thereof, to improve the accuracy of the location of the source vehicle with respect to the 3D map database. In another embodiment, in a racing source vehicle upon a closed course, the global positioning device can be replaced with a device receiving highly accurate localizing data from closed course infrastructure devices, giving the source vehicle a precise vehicle location upon the closed course. Information from the vehicle sensor systems and the vehicle operation sensors can be utilized by the EVS system manager 110 to monitor the current orientation of the source vehicle. Orientation can include a number of parameters known in the art detailing how the vehicle is configured upon the roadway and a condition of the vehicle. Exemplary parameters include pitch, roll, yaw, heave, and warp.

HUD 150 includes a windscreen equipped with features capable of displaying an image projected thereupon while remaining transparent or substantially transparent such that occupants of the source vehicle can clearly observe outside of the source vehicle through the windscreen. HUD 150 can include features capable of displaying in image on a portion of the windscreen or on a substantially entirety of the full windscreen. One will appreciate that while HUD 150 includes the windscreen in the front of the source vehicle, other surfaces within the source vehicle can additionally or alternatively be used for projection, including side windows and a rear window. Additionally, the view on the front windscreen could be continued upon the "A-pillars" of the vehicle and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations.

A driver registration input enables display of a registered graphic upon the HUD 150, with the graphic being located upon the HUD relative to the view of the driver and the context of objects or roadway details visible through the HUD. A driver registration input can include information about the location of the eyes and/or the head of the driver. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the source vehicle 100, a user input location and a future navigation maneuver location, EVS system manager 110 can accurately dynamically register the graphical representations to the HUD 150 such that the occupant sees the images overlaid with visual images through the display.

The EVS and other devices or systems in the vehicle can use or be a part of a control module within the vehicle. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Graphics generated upon HUD 150 can include a number of different embodiments serving different functions. According to one embodiment, graphics can be a driver's aid, representing information useful to the driver with respect to control of the vehicle. Based upon global positioning data and/or information from vehicle sensor devices, a road geometry proximate to the vehicle can be monitored and used to determine a recommended driving path or racing groove for the vehicle. A method is disclosed to project a registered driving path image upon a HUD to aid the driver in controlling the vehicle.

A driving path is an illustration of a preferred or recommended plot that the vehicle can use to travel upon a section of road. One exemplary driving path that can be displayed is an ideal driving path, or a path that shows a desired path for a perfect vehicle on the roadway irrespective of where an actual vehicle is currently located. Methods to determine or define an ideal driving path for a closed course are known in the art and will not be disclosed in detail herein. A driving path can be determined for a given section of road based upon a number of factors. For example, in a curved section of road, a driving path can be determined based upon maximizing vehicle speed at the exit of the turn. Geometry of the roadway such as a curvature or a turn radius of the road through a segment in front of the vehicle can be determined by monitoring inputs detailing an operating environment of the vehicle. For example, a global positioning and 3D map device can be used to pinpoint a location of the vehicle and the geometry of the roadway proximate to the vehicle. The accuracy of the global positioning data can be improved by using camera, radar, LIDAR, or other data available through vehicle sensors. Geometry of the roadway can further include slope, crown, banking, camber, grade, friction coefficient, or other similar terms. Alternatively, the geometry of the roadway can be determined by monitoring vehicle sensors and estimating road geometry based upon the sensors. Speed limits and recommended speeds for sections of road can be monitored through a 3D map and/or can be monitored through image recognition of images of roadside signs. These speed limits and/or recommended speeds can be used to determine a driving path for a section of road. Alternatively, data regarding a roadway or closed course geometry can be pre-loaded, recorded from previous or practice laps or previous travel over the roadway, streamed to the source vehicle via a wireless connection, or be made available through other methods known in the art. Additionally or alternatively, a foot pedal position, a current speed of the source vehicle, monitored speeds of other vehicles on the section of road, and historical speeds of the source vehicle on the particular section of road can be used to determine the driving path. Driving paths can be modified based upon other details of the operating environment of the source vehicle, for example, a predicted desired speed on the road surface past the curved section, road conditions, geometry of the road including side to side incline, longitudinal incline, or a curvature in the road surface, and monitored behavior of the source vehicle. In one exemplary condition, wherein a sudden rainfall upon a section of a closed course is detected, the driving path can be changed to reflect an effect that the rain will have upon the closed course. For example, an ideal driving path for a turn can change dramatically based upon whether the closed course is dry or wet.

Projecting a driving path in a field of view in front of the source vehicle being driven can have a number of applications. One group of applications includes applications useful in a racing environment. For example, a representation of a vehicle can be used to project to a driver an ideal or recommended path that the vehicle should follow. A driver on a closed course normally must keep the driving path in mind while the driver additionally must consider all of the other information required to operate the vehicle and compete in the race successfully. By presenting to the driver the ideal driving path for the closed course upon a HUD, a recommended path determined irrespective of a current position of the source vehicle with respect to the road surface, the driver can devote more attention to the other information, for example, the location of another vehicle, without having to additionally determine the best path. Used in this way, the ideal driving path is used as a reference for the driver, quickly providing the driver details of the orientation of the source vehicle with respect to the closed course. The ideal driving path can be a static path for a given closed course. In the alternative, the EVS can modify the driving path for any of the factors that affect the driving path, such as closed course conditions. If the source vehicle is not currently aligned with the ideal driving path, the driver can see where the ideal driving path is located and adjust the source vehicle toward the ideal driving path. Based upon input from the driver or someone supporting the driver, the ideal driving path can be adjusted through the course of a race, for example, based upon a condition of the closed course. Additionally or alternatively to the ideal driving path, a tactical driving path can be determined recommending to the driver a path that the source vehicle actually take based upon a current position of the source vehicle with respect to the road surface. For example, if the source vehicle is a car width outside of the ideal driving path going into a curved section, a tactical driving path can follow an ideal driving path around the curve, gradually merging with the ideal driving path through the curve until it merges at or near the end of the curved section. A driving path can also be projected on non-curved sections of road. For example, a driving path is known to include entering a curve from a wide portion of the turn, hitting the inside of the curve at an apex of the curve, and exiting the curve toward and outside portion of the curve. The driving path on a non-curved section of the roadway can include a path to get the source vehicle in a proper position to enter the upcoming curve. On closed courses with complex road geometries, a driving path on a non-curved section can include transitioning from one side of the closed course exiting a first turn to the other side of the closed course preparing to enter a second turn. On a closed course including a turn one way transitioning directly to a turn in the other way, a driving path can include hitting the transition between the turns at substantially the center of the closed course.

Additionally, a driving path can be adjusted based upon monitored inputs, for example, describing traffic proximate to the source vehicle being driven. While a tactical driving path might be desirable to eventually merge with an ideal driving path, presence of another vehicle in the driving path next to the source vehicle being driven can prevent such a path, and therefore the tactical driving path may need to be adjusted to maintain a safe relationship between the two vehicles. Other information can be input to modify the driving path. For example, the driver or a pit crew can indicate an intention of the source vehicle to enter a pit row on the next lap, and the driving path can be adjusted to indicate a most efficient path for the source vehicle to enter to pit row, stop successfully at the particular area of the pit crew, and then reenter the closed course. In another example, in the event of a collision upon another area of the closed course, the driving path can be adjusted to aid the driver in avoiding the vehicles that collided and any debris field upon the closed course. Such information can be directly monitored by sensors on the vehicle, or the information can be communicated to the vehicle over a wireless communication network, for example, with a spotter identifying to the vehicle an area of the closed course to be avoided.

Figure 2:
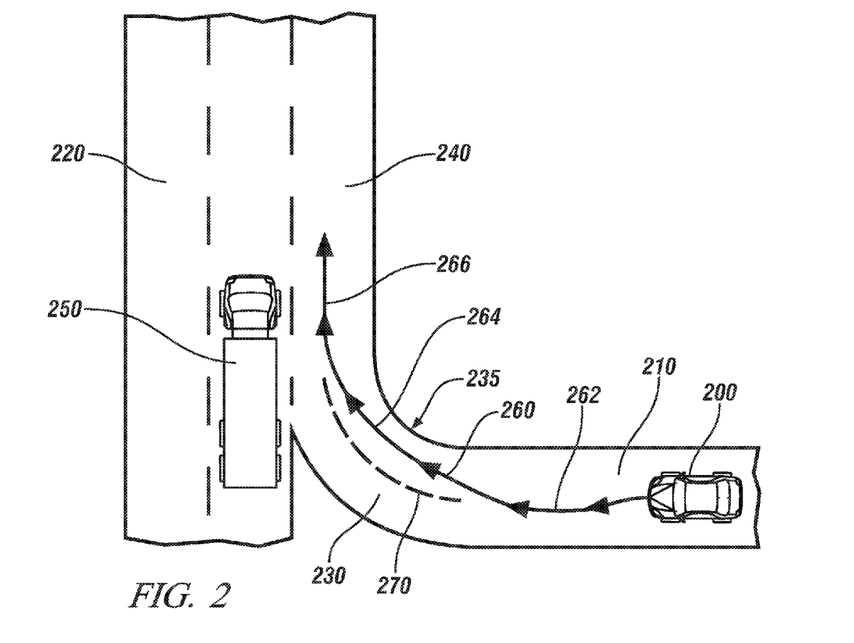
FIG. 2 illustrates a vehicle utilizing a highway on-ramp and an exemplary determined driving path, in accordance with the present disclosure.

Another group of applications includes applications useful in a normal driving environment, wherein a source vehicle operates upon public roads. While a driving path is important in racing to improving lap times and helping the driver to compete, a driving path in normal driving can be useful to helping a driver to maintain maximum control of the source vehicle. In one embodiment, a driving path can be used to reduce abrupt control changes by the driver that might cause the source vehicle to lose traction or speed through the turn. In another embodiment, a driving path on a highway on-ramp can be used to aid the source vehicle in accelerating to a speed whereat the source vehicle can merge safely with highway traffic while maintaining maximum control of the source vehicle on the ramp. A number of different inputs can be utilized to determine the recommended driving path. For example, traffic around or proximate to the source vehicle can be detected and used to determine the driving path based upon how the source vehicle can operate in traffic. In another example, obstacles or features of the roadway that need to be avoided, such as potholes, can be detected by vehicle sensors and used to determine the driving path. In one embodiment, vehicle-to-vehicle communication or communication with a remote computing device can be additionally or alternative used to identify obstacles or roadway features that should be avoided. In another embodiment, factors affecting a driving path upon a roadway can be determined or accessed from a historical database and used to determine the driving path. Such factors can include weather conditions, road conditions, a friction coefficient for the roadway, and other factors known in the art. In one embodiment, a presence or proximity of an emergency vehicle on the roadway with the source vehicle can be monitored, and a driving path to comply with requirements to get out of the way of the emergency vehicle can be determined FIG. 2 illustrates a source vehicle utilizing a highway on-ramp and an exemplary determined driving path. Source vehicle 200 is illustrated upon road surface 210. Highway 220 is illustrated including on-ramp 230 and merging lane 240. A vehicle may progress along road surface 210, along on-ramp 230, and into merging lane 240, whereupon the vehicle is expected to merge on the remainder of highway 220 at speed with traffic 250 on highway 220. Driving path 260 is illustrated. On-ramp 230 includes a curved section of road. An apex 235 of a curved section of road can be defined whereat a driving path should reach a closest point to the inside edge of the roadway. Additionally, a position of the source vehicle at the apex, for example, including a distance that the wheels of the source vehicle should be from the inside edge of the roadway or an inside lane marker, can be selected by methods known in the art. Driving path 260 reaches its closest point to an inside edge of on-ramp 230 at apex 235. Driving path 260 includes a driving path segment 264, where driving path 260 approaches its closest point to the inside edge of on-ramp 230 at apex 235 and then fades away from the inside edge of on-ramp 230 as apex 235 is passed. Further, driving path 260 includes a initial segment 262 wherein the source vehicle adjusts from normal driving upon road surface 210 to driving path 260 and ending segment 266 wherein driving path 260 transitions to normal driving upon a road segment after on-ramp 230 or merging lane 240.

In racing conditions, a driving path can start at the beginning of a curved section at an outside extreme of the roadway, approach the inside edge extreme of the roadway at the apex, and then approach the outside extreme of the roadway at the end of the curved section. Additionally, a speed of a racing source vehicle can be modified in the first half of the curved section and then accelerated once the apex is reached. Due to considerations in normal driving, a driving path for use in normal driving can be adjusted from a driving path that would be used on a closed course. For example, the driver of a source vehicle in normal driving is unlikely to want to utilize the full capacity of the source vehicle to accelerate and needs to observe traffic laws through the maneuver. Also, maneuvers that take a source vehicle to extreme edges of lanes where the lane is adjacent to another lane of travel can be undesirable. For example, as on-ramp 230 ends and merging lane 240 begins, source vehicle 200 within lane 240 can be adjacent to traffic 250, and it can be undesirable for the driver of source vehicle 200 to be at an extreme edge of lane 240 close to traffic 250. As a result, driving path 260 can be modified from a driving path developed under racing conditions by confining the driving path 260 to terminate in the center of merging lane 240 rather than at an extreme outside edge of the roadway. A degree to which the driving path is adjusted from a driving path utilizing under racing conditions can be set permanently for a source vehicle or may be configurable by the driver of the source vehicle. Initial segment 262 includes a portion where source vehicle 200 approaches an outside edge of the roadway in order to ease a transition into driving path segment 264. The degree to which the initial segment 262 is permitted to approach the outside edge of the roadway can also be set permanently or can be configurable. Driving path 260 includes a turning radius which determines the maximum vehicle speed at the exit of the turn. A lane center 270 is illustrated showing a path that source vehicle 200 would travel if it traveled along a center of on-ramp 230. Comparing driving path 260 with lane center 270, it is evident that source vehicle 200 utilizing driving path 260 travels along a path with a greater turning radius, and therefore would enable a higher maximum vehicle speed at the exit of the turn, as would a vehicle traveling along lane center 270. By determining driving path 260, source vehicle 200 can travel at a given speed or according to a given speed profile along on-ramp 230 with a greater control than can a similar vehicle traveling along lane center 270 at the same speed or speed profile.

Determination of a driving path can include monitoring a planned route for the source vehicle. If a current road being driven upon includes a choice to go one of a plurality of directions, a projected driving path determined without knowledge of a planned route or an intention of the driver could incorrectly position the source vehicle. In the event a choice of routes is upcoming and the system does not have information to estimate the choice, projection of the driving path can be suspended. In one embodiment, the system can prompt the choice to the driver, for example, displaying the choice textually upon the HUD for selection by the driver, either through an input device or a voice recognition command. In one embodiment, a historical database with details useful to determining a driving path can be accessed. For example, if the source vehicle travels over the path three times a week and the driver makes the same choice substantially every time, then a driving path can be selected based upon the clear likelihood that the driver will make the usual choice.

Figure 3:
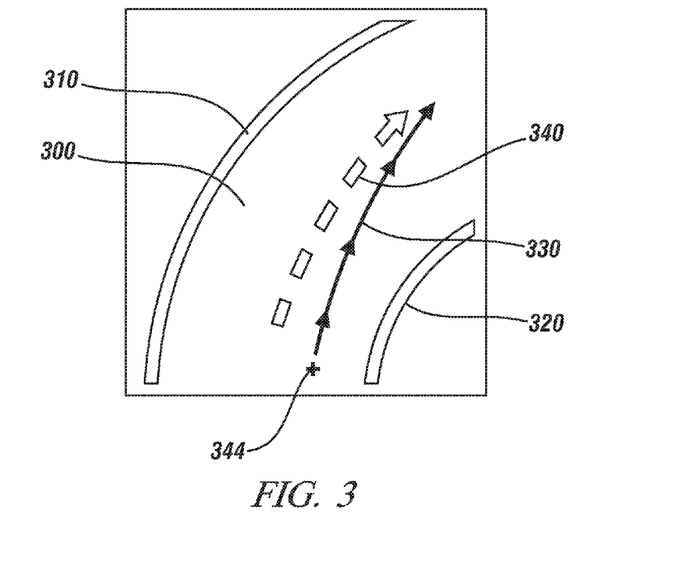
FIG. 3 illustrates an exemplary curved section of road, an ideal driving path, and a tactical driving path, in accordance with the present disclosure.

FIG. 3 illustrates an exemplary curved section of road, an ideal driving path, and a tactical driving path. Road surface 300 is illustrated from a top down view. Outside lane marker 310 and inside lane marker 320 define a curved section of road. Ideal driving path 340 illustrates an exemplary driving path after an apex in the curve, wherein ideal driving path 340 is crossing the lane of travel consistent with the curved section ending and the subsequent road surface transitioning to a non-curved section. Tactical driving path 330 is illustrated, showing a driving path that can be determined for a vehicle traveling through the curved section not at a location on the ideal driving path 340, for example, a vehicle located at point 344.

Figure 4:
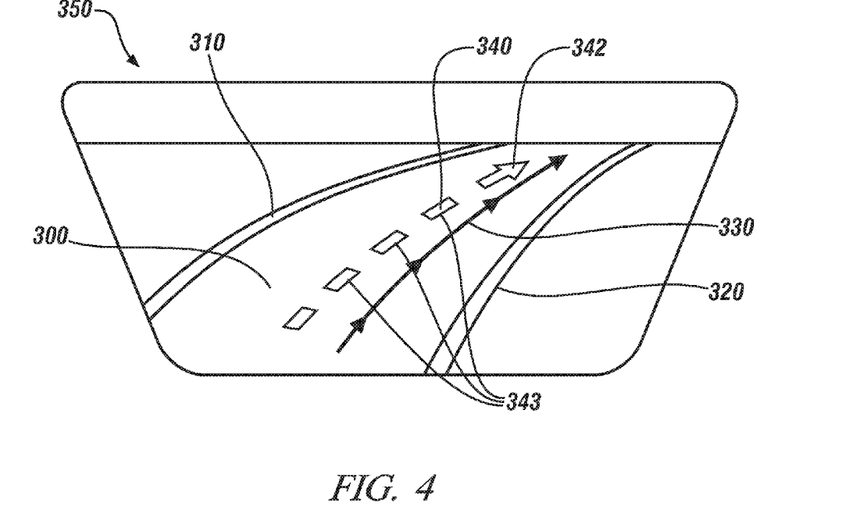
FIG. 4 illustrates an exemplary view through a head-up display including graphics projecting an ideal driving path and a tactical driving path upon the view of a roadway, in accordance with the present disclosure.

FIG. 4 illustrates an exemplary view through a HUD including graphics projecting an ideal driving path and a tactical driving path upon the view of a roadway. A view from a source vehicle at point 344 in FIG. 3 is illustrated in FIG. 4, with the road surface 300 and projections of ideal driving path 340 and tactical driving path 330 upon the windscreen HUD. Outside lane marker 310 and inside lane marker 320 are visible through the HUD. Tactical driving path 330 is projected with a relatively heavy graphic, providing a recommended line for the driver to follow, in one embodiment, being represented by a single line with inset arrows, for reference by the driver. Ideal driving path 340 is simultaneously projected, in one embodiment, with a relatively lighter graphic, providing reference to for the driver of the ideal driving path while being subdued in comparison to the tactical driving path 330 providing a current recommended driving path. One embodiment of a driving path image can include an arrowhead graphic 342 and a plurality of line segments 343. The HUD illustrated in FIG. 4 corresponds to an embodiment in a car or truck. A similar HUD could be depicted for a motorcycle, four-wheeler all terrain vehicle, racing boat using on a water track defined by buoys, or any other vehicle that can be used in a racing environment or in normal driving upon a roadway, and the disclosure is not intended to be limited to the particular exemplary embodiments disclosed herein.

Graphics illustrating driving paths in a projection upon a windscreen HUD can include a number of embodiments. A driving path can be illustrated by a solid line of any weight, color, or intensity. A driving path can be illustrated by a solid line with an inset arrow or inset arrows, as illustrated by ideal driving path 330 of FIG. 4. A driving path can be illustrated by a segmented line. The segmented line can include a static illustration, wherein the segments are projected constantly at same locations relative to the source vehicle, such that the segments do not appear to move to the driver. In another embodiment, the segments can be made to dynamically cycle, maintaining a position relative to the road surface, such that a segment appears to be painted upon the roadway. A lead segment of the line can be an arrowhead graphic, as illustrated in arrowhead 342 of FIG. 4. In one embodiment, each of the segments can be an arrowhead graphic. The graphics can include static dimensions regardless of how far the path is projected in front of the source vehicle. In another embodiment, the graphics can include perspective dimensions, with the projected path appearing to be narrower as the path is projected farther from the source vehicle. A color or intensity change to the graphic can be used to convey information, for example, changing as the actual course of the source vehicle varies from a recommended course or changing through a turn to illustrate optimal use of the accelerator pedal, brake pedal, and/or transmission gear state. A driving path can be displayed persistently upon the HUD, or in the alternative, a driving path can be displayed when a threshold is reached, for example, when a curve of a threshold severity is encountered or when operation of the source vehicle departs by more than a threshold from a determined but un-displayed ideal driving path. A number of embodiments of graphics and options for illustrating driving paths upon a HUD are envisioned, and the disclosure is not intended to be limited to the particular exemplary embodiments disclosed herein.

A graphic illustrating a driving path can include other information. For example, a color can be used to compare a current speed of the source vehicle to a recommended speed for the section of the road. In another example, vehicle sensors describing whether the wheels of the source vehicle are in solid contact with the road can be monitored, for example, anti-lock braking sensors, and the graphic can be altered or augmented if threshold slip is detected between the wheels and the road, indicating a marginal loss of control of the source vehicle. If the slip exceeds a point wherein the source vehicle begins to fish-tail, with the rear end of the source vehicle swinging toward the outside of the curve, the graphic being projected can be altered or augmented to include a suggested remedy, for example, with a recommended steering wheel angle included in the graphic to recover the source vehicle from the fish-tail.

Projection of graphics and determination of racing lines can be user configurable. For example, a driver can selectably activate or deactivate an ideal driving path and a tactical driving path. A driver can configure between any of the options described above, picking line style, color, intensity, and threshold for projecting a driving path. A single source vehicle can recognize a plurality of drivers for the source vehicle according to methods known in the art and display the preferred graphics for the current driver.

Figure 5:
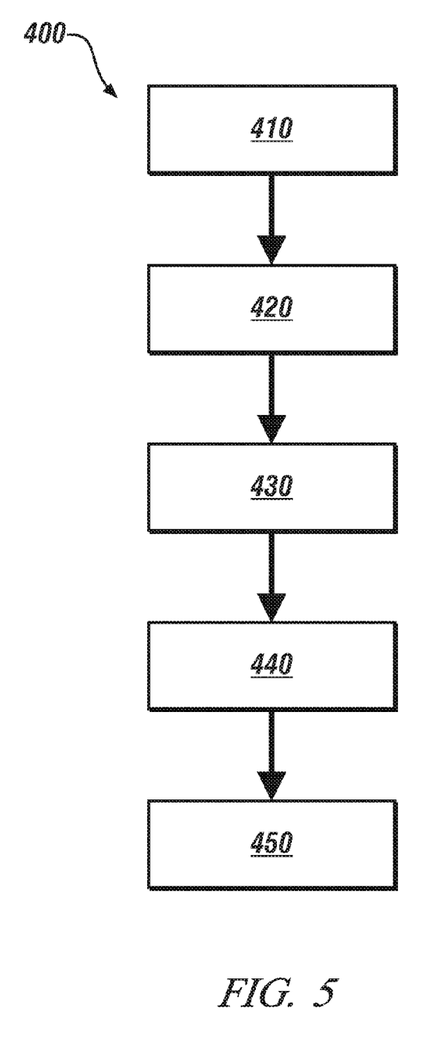
FIG. 5 illustrates an exemplary process to display a registered driving path image upon a head-up display, in accordance with the present disclosure.

FIG. 5 illustrates an exemplary process to display a registered driving path image upon a HUD. Table 1 is provided as a key to FIG. 5 wherein the numerically labeled blocks and the corresponding functions are set forth as follows.

TABLE 1

| BLOCK | BLOCK CONTENTS |
|---|---|
| 410 | Monitor an Eye Location Sensing System |
| 420 | Monitor a Location of the Vehicle |
| 430 | Determine a Road Geometry Proximate to the Vehicle Based Upon the Location of the Vehicle |
| 440 | Determine a Registered Driving Path Image Based Upon the Monitored Eye Location Sensing System and the Road Geometry Proximate to the Vehicle |
| 450 | Display the Registered Driving Path Image Upon a Head-up Display |

Process 400 starts at block 410, wherein an eye location sensing system is monitored to provide a location of the eyes of the driver of the source vehicle. In block 420, a location of the source vehicle is monitored. Such a location of the source vehicle can be based upon a global positioning coordinate and data from a vehicle sensor device. In block 430, a road geometry proximate to the source vehicle is determined, for example, by referencing a 3D map database based upon the location of the source vehicle. In block 440, a registered driving path image is determined based upon the monitored eye location sensing system and the road geometry proximate to the source vehicle according to methods disclosed herein. By monitoring the eye location sensing system, a determined graphic can be registered to the scene visible to the driver through the HUD. In block 450, the determined graphic is displayed upon the HUD.

Figure 6:
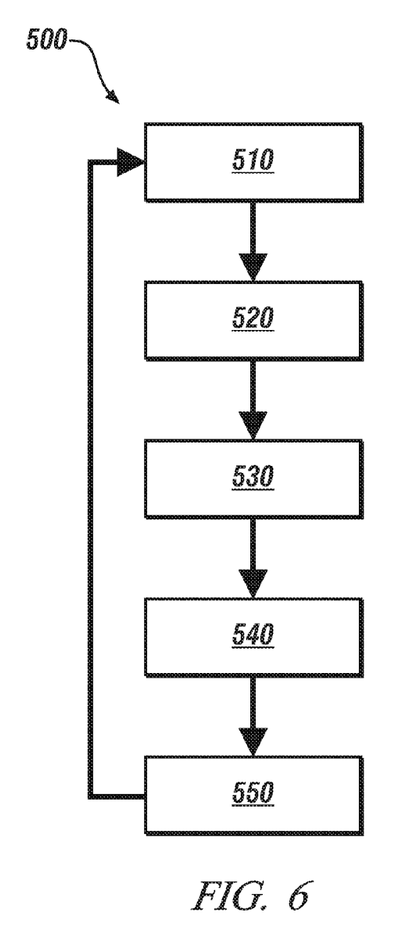
FIG. 6 illustrates an exemplary process to utilize historical data uploaded to a vehicle to display a driving path upon a head-up display in the vehicle, in accordance with the present disclosure.

FIG. 6 illustrates an exemplary process to utilize historical data uploaded to a vehicle to display a driving path upon a HUD in the source vehicle. Table 2 is provided as a key to FIG. 6 wherein the numerically labeled blocks and the corresponding functions are set forth as follows.

TABLE 2

| BLOCK | BLOCK CONTENTS |
|---|---|
| 510 | Upload Historical Data to Vehicle Related to an Ideal Driving Path |
| 520 | Determine the Ideal Driving Path Based Upon the Historical Data |

TABLE 2-continued

| BLOCK | BLOCK CONTENTS |
|---|---|
| 530 | Monitor a Current Vehicle Location and Orientation |
| 540 | Compare the Current Vehicle Location and Orientation to the Determined Recommended Driving Path and Determine a Driving Path Variance Based Upon the Comparison |
| 550 | Register and Display the Ideal Driving Path and the Driving Path Variance |

Process 500 starts at block 510, wherein historical data related to source vehicle location and orientation related to an ideal driving path for a current roadway is accessed. At block 520, the ideal driving path is determined for the current roadway based upon the accessed historical data. At block 530, current vehicle location and vehicle orientation are monitored. Current vehicle location and vehicle orientation can be fed back and associated with historical data, for example, to provide indexed comparative values of the vehicle location and orientation. At block 540, a comparison is performed of the ideal driving path and the current data, and based upon an evaluation of the comparison, a driving path variance for the source vehicle, quantifying how far from the ideal driving path the source vehicle actually is, can be determined at block 540. At block 550, the ideal driving path and the driving path variance are registered to the HUD based upon an eye location of the driver and displayed. Graphics illustrating driving path variance can take a number of embodiments illustrating how far the current source vehicle position and orientation differ from the ideal driving path.

The methods described herein can be utilized to display a registered driving path image upon a windscreen HUD, projecting a graphic to aid the driver in control of the source vehicle. Graphics can similarly be projected upon other surfaces or windows of the source vehicle. For example, a driving path can be continued from the windscreen HUD onto an A-pillar surface treated to display graphics.

A recommended driving path can be adjusted or selected based upon a number of driving priorities. For example, in a race, maximizing speed and lowering lap times are a priority. In one example, if a driver is leading a race, but is running on worn tires or a questionable amount of fuel to complete the race but a pit stop would cost the driver the lead, a recommended driving path could be adjusted to increase the likelihood that the tires will last to the end of the race or that the source vehicle will not run out of fuel before the end of the race. In normal driving upon a roadway, a number of driving priorities can be utilized or simultaneously balanced to adjust a recommended driving path. One such driving priority can include fuel economy. According to one embodiment, prior operation of the source vehicle over the roadway and fuel consumption for the prior operation can be analyzed, and a driving path that resulted in lower fuel consumption can be selected or used to adjust a current recommended path. In another embodiment, vehicle-to-vehicle communication or wireless communication to a remote computing device can be used to access fuel economy of various vehicles traveling over the roadway, and a driving path can be selected or adjusted based upon the accessed data. Other priorities that can be used to adjust or select a driving path include drivability, a smooth ride, decreased deviation of the path from the nominal center of the lane, priority for one vehicle to remain close to another vehicle, or other priorities known in the art. A plurality of driving priorities can be utilized, for example, with influences of fuel economy and smooth ride being averaged before being utilized to adjust a recommended driving path. Driving priorities can be preselected for a vehicle. In another embodiment, driving priorities can be selected or adjusted by the operator of the source vehicle. A number of different driving priorities and method to utilize the priorities to modify a recommended driving path are envisioned, and the disclosure is not intended to be limited to the particular exemplary embodiments provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to display a registered driving path image upon a transparent windscreen head-up display in a source vehicle, the method comprising:
    monitoring an operating environment of the source vehicle travelling upon a road surface, comprising:
        monitoring a location of the source vehicle through a global positioning device, and
        determining a geometry of the road surface proximate to the source vehicle based upon the location of the source vehicle and a three dimensional map database;
    monitoring a driver registration input;
    determining a registered driving path image defining a recommended plot for the source vehicle to use for travel upon a given section of the road surface based upon the operating environment of the source vehicle and the driver registration input, comprising:
        when the given section of the road surface comprises a curved section, the registered driving path image including a closest point to an inside edge of the curved section that the source vehicle should reach during a turning maneuver through the curved section to enable a maximum desired vehicle speed at an exit of the curved section;
        when the source vehicle operates upon public roads:
            monitoring a driving priority;
            monitoring historical driving paths cross-referenced with the driving priority, wherein the registered driving path image is based upon the historical driving paths; and
    displaying the registered driving path image upon the head-up display.

2. The method of claim 1, wherein monitoring the operating environment of the source vehicle further comprises:
    monitoring a vehicle sensor device; and
    wherein determining the road geometry proximate to the source vehicle is further based upon the monitored vehicle sensor device.

3. The method of claim 1, wherein determining the registered driving path image comprises determining an ideal driving path illustrating a recommended path for the source vehicle irrespective of a current position of the source vehicle with respect to the road surface.

4. The method of claim 1:
    wherein the operating environment of the source vehicle comprises a current position of the source vehicle with respect to the road surface; and
    wherein the registered driving path image comprises a tactical driving path image illustrating a recommended path for the source vehicle.

5. The method of claim 4, further comprising:
    determining an ideal driving path image illustrating a recommended path for the source vehicle irrespective of the current position of the source vehicle with respect to the road surface; and
    displaying the ideal driving path image upon the head-up display.

6. The method of claim 1 wherein the operating environment of the source vehicle further-comprises monitoring a location of traffic proximate the source vehicle.

7. The method of claim 1, wherein the source vehicle comprises a racing source vehicle operating upon a closed course.

8. The method of claim 1, wherein the driving priority comprises fuel economy.

9. The method of claim 1, wherein monitoring the operating environment of the source vehicle further comprises monitoring a planned route of travel when the source vehicle operates upon public roads.

10. The method of claim 1, wherein monitoring the operating environment of the source vehicle further comprises monitoring an obstacle in a roadway.

11. The method of claim 10, wherein monitoring the obstacle in the roadway comprises monitoring historical data stored in a database.

12. The method of claim 10, wherein monitoring the obstacle in the roadway comprises monitoring vehicle-to-vehicle communications from another vehicle located in front of the source vehicle.

13. The method of claim 1, further comprising:
    monitoring a current location and orientation of the source vehicle; and
    comparing the current location and orientation of the source vehicle to an ideal driving path to determine a driving path variance; and
    wherein determining the registered driving path image is further based upon the driving path variance.

14. The method of claim 1, wherein the operating environment of the source vehicle comprises a proximity to an emergency vehicle.

15. System to display a registered driving path image upon a transparent windscreen head-up display in a source vehicle, comprising:
    a transparent windscreen head-up display;
    an enhanced vision system
        monitoring an operating environment of the source vehicle travelling upon a road surface, comprising:
            monitoring a location of the source vehicle through a global positioning device, and
            determining a geometry of the road surface proximate to the source vehicle based upon the location of the source vehicle and a three dimensional map database,
        monitoring a driver registration input, and
        determining a registered driving path image for a given section of the road surface based upon the operating environment of the source vehicle and the driver registration input, comprising
            when the given section of the road surface comprises a curved section, the registered driving path image including a closest point to an inside edge of the curved section that the source vehicle should reach during a turning maneuver through the curved section to enable a maximum desired vehicle speed at an exit of the curved section;
            when the source vehicle operates upon public roads:
                monitoring a driving priority;

monitoring historical driving paths cross-referenced with the driving priority, wherein the registered driving path image is based upon the historical driving paths; and
a graphic projection system displaying the registered driving path image upon the head-up display.

* * * * *